United States Patent [19]
Adamec

[11] Patent Number: 6,035,437
[45] Date of Patent: Mar. 7, 2000

[54] COMMUNICATION DEVICE AND METHOD FOR ELECTRONIC PRICE LABEL SYSTEMS

[75] Inventor: Andrew J. Adamec, Duluth, Ga.

[73] Assignee: NCR Corporation, Dayton, Ohio

[21] Appl. No.: 08/992,667

[22] Filed: Dec. 17, 1997

[51] Int. Cl.[7] .................................................. G06F 11/00
[52] U.S. Cl. ............................................. 714/812; 714/48
[58] Field of Search ...................... 714/811, 812, 714/746, 748, 749; 705/18, 43, 5, 16, 20, 21, 25; 455/39, 45, 53.1, 69, 70

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,896,151 | 1/1990 | Kuranami et al. | 340/825.52 |
| 4,924,363 | 5/1990 | Kornelson | 362/125 |
| 5,172,314 | 12/1992 | Poland et al. | 364/401 |
| 5,448,226 | 9/1995 | Failing, Jr. et al. | 340/825.35 |
| 5,758,064 | 5/1998 | Zimmerman et al. | 395/183.19 |
| 5,794,215 | 8/1998 | Goodwin, III | 705/26 |
| 5,818,346 | 10/1998 | Goodwin, III et al. | 340/825.49 |

*Primary Examiner*—Trinh L. Tu
*Attorney, Agent, or Firm*—Paul W. Martin; Peter H. Priest

[57] ABSTRACT

A communication device and method for electronic price label (EPL) systems which use EPL components. The device includes a microcontroller, a first EPL circuit enabled by the microcontroller which sends a first signal to an EPL computer in response to a first polling signal from the EPL computer indicating that data from the microcontroller is ready for transmission, a number of second EPL circuits which store the data from the microcontroller and which send the data to the EPL computer in response to a second polling signal from the EPL computer, a third EPL circuit which receives a second signal from the EPL computer acknowledging receipt by the EPL computer of the data, and which signals the microcontroller of the receipt of the data, a keypad coupled to the microcontroller for recording the data from an operator, and a display for displaying the data as it is recorded and for displaying an indication of the receipt of the data.

16 Claims, 5 Drawing Sheets

COMMUNICATION DEVICE AND METHOD FOR ELECTRONIC PRICE LABEL SYSTEMS

CROSS-REFERENCE TO RELATED APPLICATION

The present invention is related to commonly assigned and co-pending U.S. application Ser. No. 08/992,749 entitled, "Remote Control Device and Method for Electronic Price Label Systems", filed Dec. 17, 1997, and invented by Adamec.

BACKGROUND OF THE INVENTION

The present invention relates to electronic price label (EPL) systems used in transaction establishments, and more specifically to a communication device and method for EPL systems.

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

EPLs today may be wired or wireless. Wireless EPLs may employ infrared or radio frequency (RF) transmitters. EPLs systems of the assignee of the present invention employ RF transmitters and modulated backscatter techniques. An EPL computer transmits polling signals to one or more EPLs. In order to respond to the poll, an EPL "reflects" the polling signal back to the EPL computer within a predetermined time interval of receiving the polling signal. A good analogy of the RF modulated backscatter acknowledgment signal is a mirror reflection. If two men face each other, one with a flashlight and the other with a mirror, the man with the mirror can send an acknowledgment to the man with the flashlight by reflecting the beam of light back to him. Similarly, the man with the mirror may indicate the opposite by not reflecting the light of the flashlight.

Modulated backscatter techniques are taught in U.S. Pat. No. 5,640,683, to Evans et al., entitled "Modulated Backscatter Wireless Communication System Having An Extended Range", issued Jun. 17, 1997. This patent is hereby incorporated by reference.

Remote control and communication with a host EPL computer system would be desirable anytime the EPL system installer, user, or administrator is performing EPL related tasks away from the host EPL computer. One such task that might be performed by an EPL system administrator is adding or removing an EPL tag to a shelf. Normally, the administrator must perform administrative tasks at the host processor before placing the tag on the shelf. These tasks include initializing the EPL tag and adding the ID of the EPL tag to an EPL database. It would be advantageous to perform these administrative tasks remotely as the system administrator is adding or removing the tag from the shelf.

Hand-held terminals have been developed which communicate with the EPL computer, effectively allowing remote communication with the host processor. However, these terminals are costly and can introduce noise that may interfere with the EPL system. When a hand-held terminal device is introduced that does not share the same communication protocol or hardware as the EPL system, there is some likelihood that the device will interfere with existing EPL system communication. In order to avoid interference, the EPL system must sacrifice performance by giving up radio frequency bandwidth to the device.

Therefore, it would be desirable to provide a communication device and method for EPL systems that would allow an operator to remotely control the EPL computer from anywhere in a store using the existing EPL infrastructure.

SUMMARY OF THE INVENTION

In accordance with the teachings of the present invention, a communication device and method for EPL systems is provided.

The device includes a microcontroller, a first EPL circuit enabled by the microcontroller which sends a first signal to an EPL computer in response to a first polling signal from the EPL computer indicating that data from the microcontroller is ready for transmission, a number of second EPL circuits which store the data from the microcontroller and which send the data to the EPL computer in response to a second polling signal from the EPL computer, a third EPL circuit which receives a second signal from the EPL computer acknowledging receipt by the EPL computer of the data, and which signals the microcontroller of the receipt of the data, a keypad coupled to the microcontroller for recording the data from an operator, and a display for displaying the data as it is recorded and for displaying an indication of the receipt of the data.

The device may be used as a remote control device in which the data includes functions to be executed by the EPL computer from a list of functions maintained by the EPL computer.

In more detail, the second EPL circuits each include a first portion including first control circuitry having a first unique address and a first state out of first and second operational states, and a second portion including second control circuitry having a second unique address and a second state out of the first and second operational states. The EPL computer interprets a binary data "0" when the first state is equal to the first operational state and the second state is equal to the second operational state, and interprets a binary data "1" when the first state is equal to the second operational state and the second state is equal to the first operational state.

The method of the present invention includes the steps of loading a number of EPL data circuits having first and second portions with a portion of data by a microcontroller, and transmitting the data to the EPL computer by the EPL data circuits in response to a polling message from the EPL computer. Loading involves the substeps of enabling acknowledgment of polling messages by the first portions of a first group of the EPL data circuits and disabling acknowledgment of the polling messages by the second portions of the first group of EPL data circuits to form a data value equal to zero, and disabling acknowledgment of polling messages by the first portions of a second group of the EPL data circuits and enabling acknowledgment of the polling messages by the second portions of the second group of EPL data circuits to for a data value equal to one.

It is accordingly an object of the present invention to provide a communication device and method for EPL systems.

It is another object of the present invention to provide a communication device and method for EPL systems which would allow an operator to remotely send data to an EPL computer from anywhere in a store.

It is another object of the present invention to provide a remote control device and method for EPL systems which would allow an operator to remotely control an EPL computer from anywhere in a store.

It is another object of the present invention to provide a communication device and method for EPL systems that utilizes the existing EPL infrastructure.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
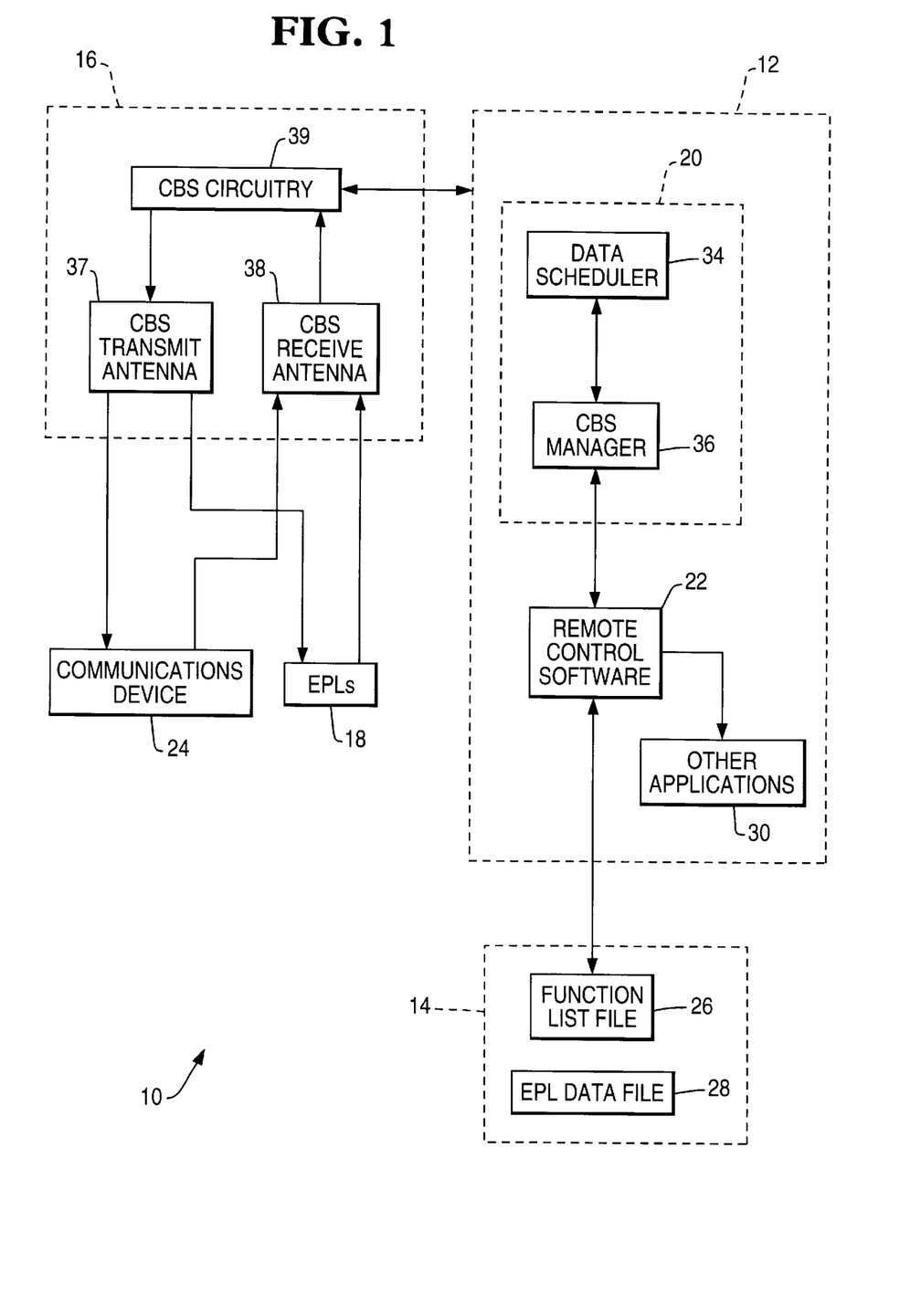
FIG. 1 is a block diagram of an EPL system.

Referring now to FIG. 1, EPL system 10 includes computer 12, storage medium 14, communication base station (CBS) 16, electronic price labels (EPLs) 18, and communication device 24. EPL system 10 makes use of modulated backscatter communication techniques.

Computer 12 executes EPL control software 20, remote control software 22, and other applications 30. EPL control software 20 records, schedules, and transmits all messages to EPLs 18 and device 24 through CBS 16, and receives and analyzes messages from EPLs 18 and device 24 through CBS 16.

Figure 3A:
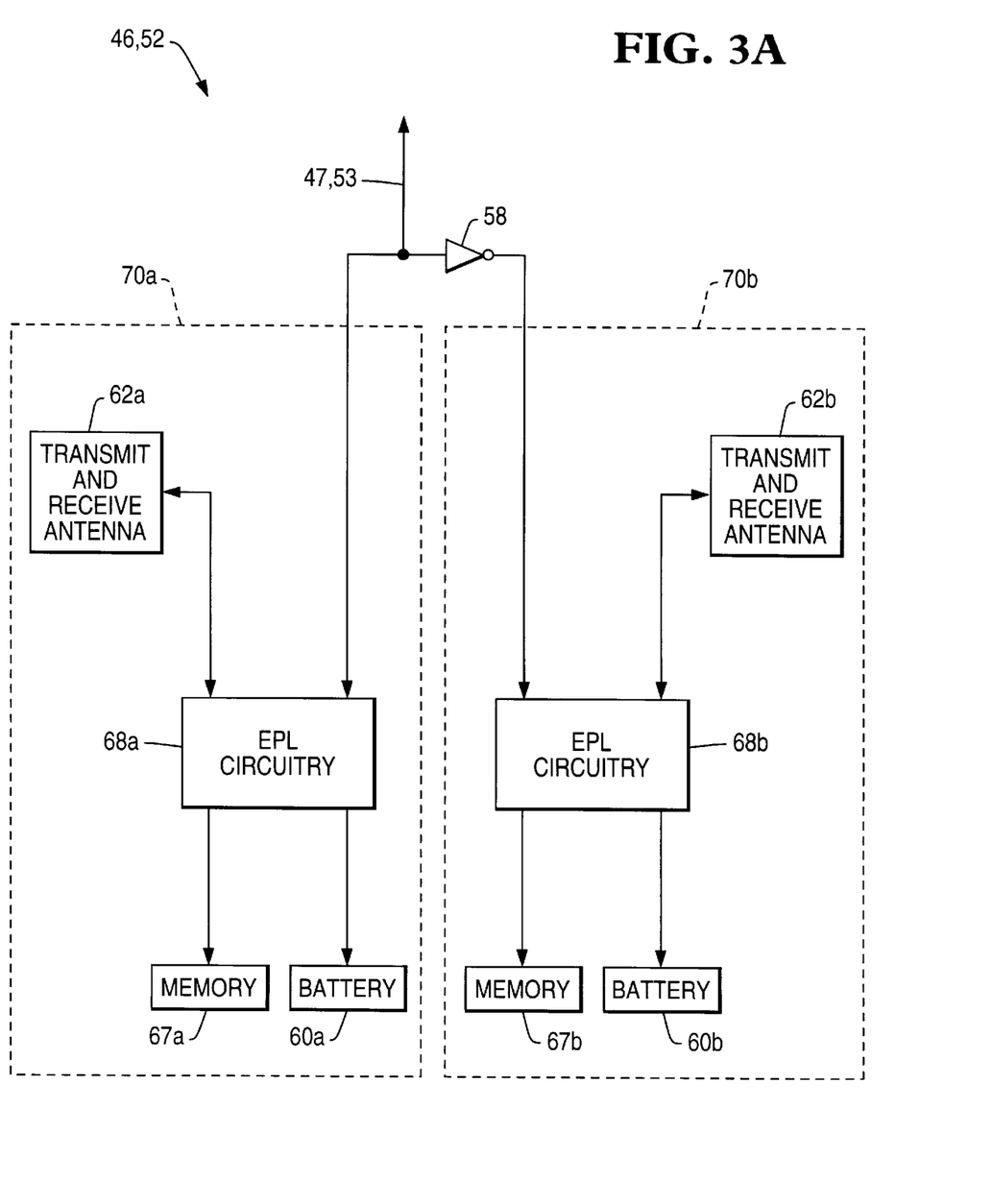
FIGS. 3A and 3B are block diagrams illustrating further detail associated with the communication device of FIG. 2.

EPL control software 20 maintains and uses EPL data file 28. EPL data file 28 contains item information, EPL identification information, and status information for each of EPLs 18 and portions 70a and 70b of device 24 (FIG. 3).

EPL control software 20 primarily includes data scheduler 34 and CBS manager 36. Data scheduler 34 schedules EPL price change messages to be sent to EPLs 18 through CBS 16. Data scheduler 34 schedules polling and EPL computer acknowledgment messages to be sent to device 24 through CBS 16.

Remote control software 22 causes EPL control software 20 to poll device 24 and uses the responses received from device 24 to signal EPL computer 12 to perform predetermined functions.

Remote control software 22 maintains a function list 26 which is a look-up table that associates responses from device 24 with functions to be implemented when those responses are received. Such functions include gathering signal and noise data, starting or stopping a promotion or a group of promotions, signaling EPL computer 12 to perform a diagnostic test on CBS 16 while a technician physically examines CBS 16 where it is mounted in a ceiling, turning on and off EPL electronic signage. Advantageously, any of the functions described above may be performed at any time and in any order.

Remote control software 22 calls other applications 30 and/or EPL control software 30 to perform the functions. Remote control software 22 accepts function codes which it interprets or decodes by referencing function list file 26, and accepts secondary and tertiary data which represent arguments to the requested function or action. It then signals some other application 30 to perform the requested action by making an application program interface (API) call, and passes the secondary and tertiary data to the other application 30 using the appropriate API or series of APIs.

Storage medium 14 is preferably a fixed disk drive. Storage medium 14 stores EPL data file 28 and function list file 26.

CBS 16 preferably includes one transmit antenna 37 and up to four receive antennas 38 for transmitting and receiving messages between CBS 16 and EPLs 18 and between CBS 16 and device 24. CBS 16 includes CBS circuitry 39 which controls operation of CBS 16. EPL system 10 preferably includes a plurality of CBSs 16 connected together in series.

CBS manager 36 schedules transmission of price change messages to EPLs 18 and polling messages to device 24. CBS manager 36 controls reception of status messages from EPLs 18 and control messages from device 24 for predetermined time slots.

Figure 2:
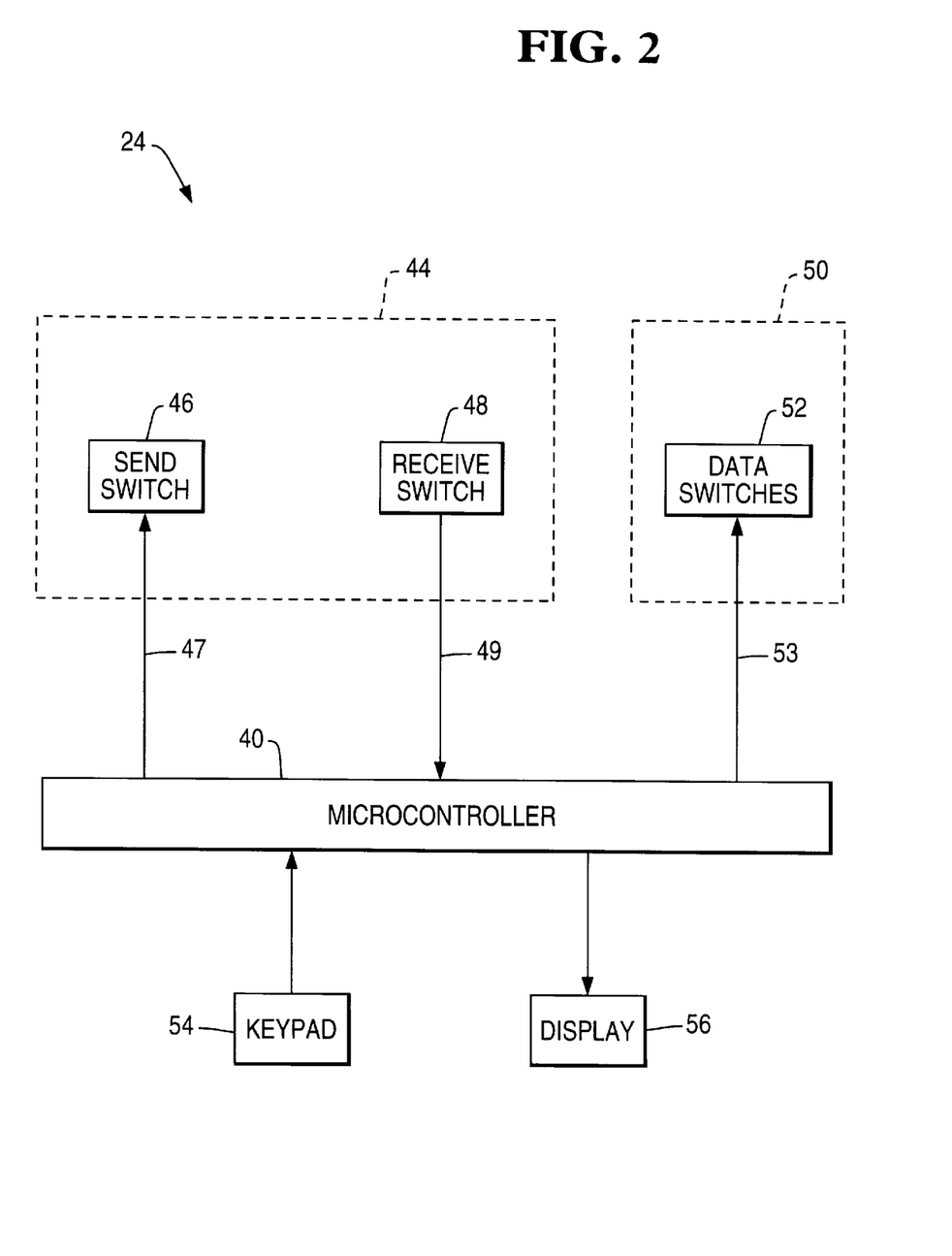
FIG. 2 is a block diagram of a communication device in accordance with the present invention.

Turning now to FIG. 2, device 24 is shown in more detail. Device 24 includes microcontroller 40, handshake communications circuitry 44, data communications circuitry 50, keypad 54, and display 56.

Microcontroller 40 controls operation of device 24 and includes its own read-only memory (ROM), random-access memory (RAM), and peripheral interface controller. A separate microcontroller and peripheral interface adapter are also envisioned.

Handshake communications circuitry 44 transfers commands to EPL computer 12 and receives acknowledgments from EPL computer 12. For that purpose, handshake communications circuitry 44 includes send switch 46 and receive switch 48.

Send switch 46 receives transmit enable signals from microcontroller 40 over transmit enable control line 47. Control line 47 is preferably an unused display control line. The state of control line 47 can be either high (enabled) or low (non-enabled).

EPL computer 12 polls send switch 46. When EPL computer receives a signal from send switch 46 indicating that the state of send switch 46 has changed, EPL computer 12 starts polling data switches 52.

Receive switch 48 sends a read acknowledgment signal to microcontroller 40 over receive acknowledgment control line 49. The state of control line 49 can be either high (data received) or low (not received or unknown). Control line 49 is preferably an unused display control line.

EPL computer 12 transmits an acknowledgment signal to receive switch 48 after EPL computer 12 has successfully received the data in data switches 52. The acknowledgment signal from EPL computer 12 causes receive switch 48 to change its state.

Data communications circuitry 50 includes data switches 52 which transmit data words to EPL computer 12 after communication between device 24 and EPL computer 12 has been initiated by handshake communications circuitry 44. EPL computer 12 polls data switches 52 to signal data switches 52 to transmit their contents.

Data communications circuitry preferably consists of six data switches 52. Data switches 52 receive data from microcontroller 40 over data lines 53. The state of data lines 53 can be either high (binary "1") or low (binary "0"). Data lines 53 are preferably unused display control lines.

Keypad 54 records operator keystrokes for initiating functions in functions list 26. For example, a "price update"

function for updating the price displayed by an EPL may be entered into device 24 using keypad 54. Microcontroller 40 converts the keystrokes into binary data that can be transmitted via data switches 52.

Display 56 displays recorded keystrokes and system status messages, including indications to an operator that a message from EPL computer 12 was acknowledged.

Turning now to FIG. 3A, each of switches 46 and 52 are illustrated.

Switches 46 and 52 are each a combination of two EPLs 18 coupled to control lines or data lines, as appropriate. Here, the components of the two EPLs are represented as portions 70a and 70b. Each portion has a unique EPL identification number to which EPL computer 12 addresses messages.

Each of switches 46 and 52 has two valid data states as indicated in Table I below:

TABLE I

| Data State | State of portion 70a | State of portion 70b |
|---|---|---|
| 0 | not acknowledging (0) | acknowledging (1) |
| 1 | acknowledging (1) | not acknowledging (0) |

Thus, to send a data state "0", device 24 ensures that only portion 70b acknowledges a polling message from EPL computer 12. To send a data state "1", device 24 ensures that only portion 70a acknowledges a polling message from EPL computer 12. Sending a binary one in each of the two data states allows EPL computer 12 to verify that device 24 is not out of range or inoperative.

Portion 70a includes battery 60a, transmit and receive antenna 62a, memory 67a, and EPL circuitry 68a.

Portion 70b includes battery 60b, transmit and receive antenna 62b, memory 67b, and EPL circuitry 68b.

Batteries 60a and 60b provide power to portions 70a and 70b.

Transmit and receive antennae 62a and 62b transmit data and acknowledgment messages from portions 70a and 70b and receive polling and EPL computer read acknowledgment messages from EPL computer 12.

Advantageously, since device 24 is made from circuitry within EPLs like EPLs 18, it operates in the same frequency range.

Memories 67a and 67b store messages from EPL computer 12.

EPL circuitries 68a and 68b control the internal operation of portions 70a and 70b. EPL circuitries 68a and 68b store received messages from EPL computer 12 and transmit and receive messages from EPL computer 12.

EPLs typically include displays as well, but the displays are not used since display 56 provides display functions for communication device 24. The unused display control lines to microcontroller 40 are used as control lines 47 and data lines 53.

Inverter 58 ensures that portion 70b has the opposite state from portion 70a.

Figure 3B:
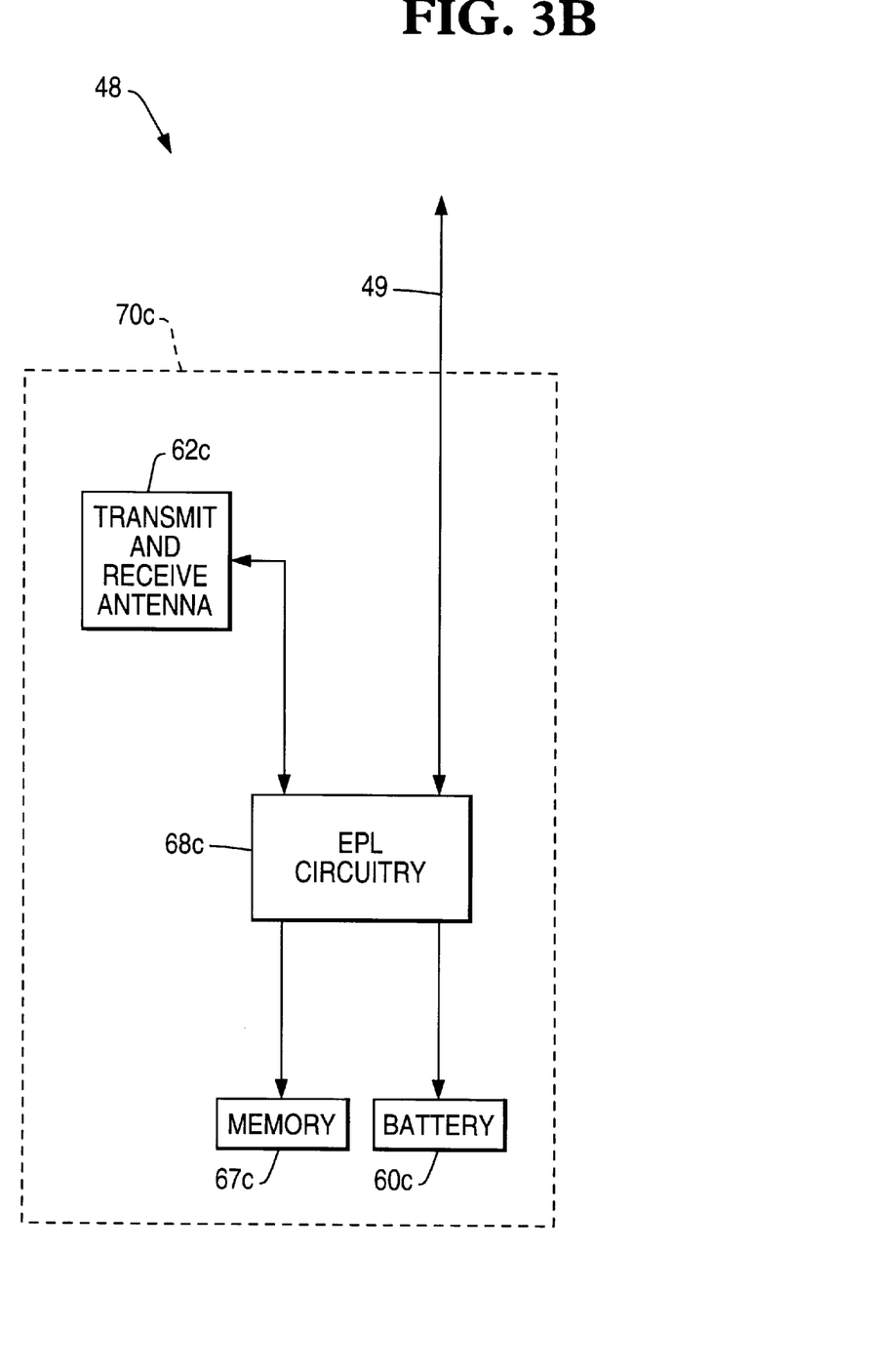

Turning now to FIG. 3B, switch 48 is illustrated.

Switch 48 includes the components of only one EPL and has a unique EPL identification number to which EPL computer 12 addresses messages.

Portion 70c includes battery 60c, transmit and receive antenna 62c, memory 67c, and EPL circuitry 68c which are similar in function to the components in portions 70a and 70b. An unused display control line to microcontroller 40 is used as control line 49.

Figure 4:
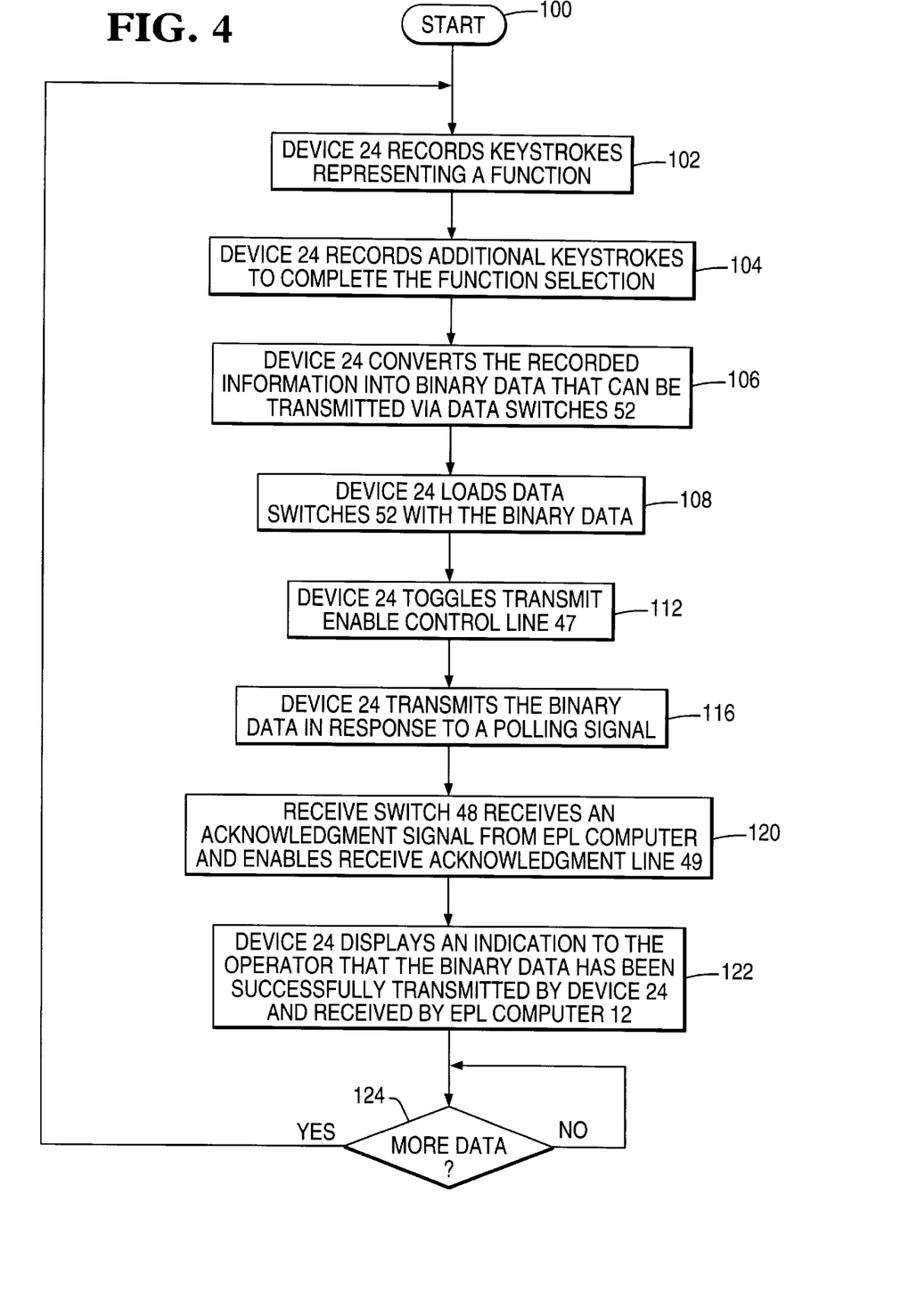
FIG. 4 is a flow diagram illustrating operation of the communication device of the present invention.

Turning now to FIG. 4, the operation of communication device 24 is illustrated in more detail, beginning with START 100.

In step 102, device 24 records keystrokes from an operator. The keystrokes are associated with one of the functions in function list 26, such as the price update function.

In step 104, device 24 records additional keystrokes to complete function selection. For example, device 24 may record data including a price-lookup (PLU) number and price for a price for the price update function. Device 24 displays the data in display 56 as they are entered.

In step 106, device 24 converts the recorded information into binary data (data states "0" or "1") that can be transmitted to EPL computer 12 via data switches 52.

In step 108, device 24 loads data switches 52 with some or all of the binary data. The amount of data loaded is dependent upon the number of data switches 52 and the amount of binary data to be loaded.

In step 112, device 24 toggles transmit enable control line 47 to make the binary data ready for transmission. Toggling involves changing the state of send switch portions 70a and 70b twice (e.g., from data state "0" to data state "1" and back again to data state "0").

In step 116, device 24 transmits the binary data to EPL computer 12 in response to a polling signal from EPL computer 12. Here, the word transmit is used to connote modulated backscatter operation. Thus, EPL computer 12 polls data switches 52 and receives a reflected signal from data switches 52 containing the data.

In step 120, receive switch 48 receives an acknowledgment signal from EPL computer 12 indicating that EPL computer 12 has received the data. In response to the signal, receive switch 48 toggles its output (e.g., high to low to high) over receive acknowledgment line 49.

In step 122, device 24 displays an indication to the operator of device 24 that the binary data has been successfully transmitted by device 24 and received by EPL computer 12.

In step 124, device 24 determines whether additional data is remaining to be sent. If so, operation returns to step 102. If not, operation waits at step 124.

After all of the data is transmitted by device 24 and received by EPL computer 12, remote control software 22 compares the received data to data in function list 26 and executes a function from function list 26 that is associated with the received data.

Remote control software 22 may additionally send another acknowledgment message to device 24. After device 24 receives the message, it displays a message which indicates to the operator that the function has been executed by EPL computer 12.

Although the present invention has been described with particular reference to certain preferred embodiments thereof, variations and modifications of the present invention can be effected within the spirit and scope of the following claims.

We claim:

1. A communication device for an electronic price label (EPL) system comprising:

a microcontroller;

a first EPL circuit which sends a first signal to an EPL computer in response to a first polling signal from the EPL computer indicating that data from the microcontroller is ready for transmission, wherein the first EPL circuit is enabled by the microcontroller;

a number of second EPL circuits which store the data from the microcontroller and which send the data to the EPL computer in response to a second polling signal from the EPL computer;

a third EPL circuit which receives a second signal from the EPL computer acknowledging receipt by the EPL computer of the data, and which signals the microcontroller of the receipt of the data;

a keypad coupled to the microcontroller for recording the data from an operator; and a display for displaying the data as it is recorded and for displaying an indication of the receipt of the data.

2. The communication device as recited in claim 1, wherein the data comprises a function to be executed by the EPL computer from a list of functions maintained by the EPL computer.

3. The communication device as recited in claim 1, wherein the third EPL circuit comprises:

third control circuitry having a third unique address;

a third antenna for receiving acknowledgment messages from the EPL computer;

a third memory coupled to the third control circuitry; and a third battery coupled to the third control circuitry.

4. The communication device of claim 1 wherein the communication device is adapted to be handheld.

5. The communication device of claim 1 wherein the communication device is adapted to allow the operator to remotely control the EPL computer.

6. The communication device of claim 1 wherein the communication device is adapted to use an existing EPL communication system to communicate commands to the EPL computer.

7. A communication device for an electronic price label (EPL) system comprising:

a microcontroller;

a first EPL circuit which sends a first signal to an EPL computer in response to a first polling signal from the EPL computer indicating that data from the microcontroller is ready for transmission, wherein the first EPL circuit is enabled by the microcontroller;

a number of second EPL circuits which store the data from the microcontroller and which send the data to the EPL computer in response to a second polling signal from the EPL computer;

wherein the first and second EPL circuits each include a first portion including first control circuitry having a first unique address and a first state;

a second portion including second control circuitry having a second unique address and a second state different from the first state;

an inverter coupled between the first and second control circuitries which causes the second state to be opposite to the first state;

first and second antennae coupled to the first and second control circuitries for receiving polling messages from the EPL computer and for sending data to the EPL computer in response to the polling messages;

first and second memories coupled to the first and second control circuitries; and first and second batteries coupled to the first and second control circuitries;

a third EPL circuit which receives a second signal from the EPL computer acknowledging receipt by the EPL computer of the data, and which signals the microcontroller of the receipt of the data;

wherein the third EPL circuit includes third control circuitry having a third unique address;

a third antenna for receiving acknowledgment messages from the EPL computer;

a third memory coupled to the third control circuitry; and a third battery coupled to the third control circuitry;

a keypad coupled to the microcontroller for recording the data; and a display for displaying the data as it is recorded and for displaying an indication of the receipt of the data.

8. A communication device for an electronic price label (EPL) system comprising:

a microcontroller; and a number of EPL data circuits which store binary data from the microcontroller and which send the binary data to an EPL computer in response to a polling signal from the EPL computer, wherein the EPL data circuits each include a first portion including first control circuitry having a first unique address and a first state out of first and second operational states;

a second portion including second control circuitry having a second unique address and a second state out of the first and second operational states;

wherein the EPL computer interprets a binary data "0" when the first state is equal to the first operational state and the second state is equal to the second operational state; and wherein the EPL computer interprets a binary data "1" when the first state is equal to the second operational state and the second state is equal to the first operational state.

9. The communication device as recited in claim 8, wherein the EPL computer interprets invalid binary data when the first and second states are equal.

10. A method of sending binary data to an electronic price label (EPL) computer comprising the steps of:

(a) loading a number of EPL data circuits with the binary data by a microcontroller, each of the EPL data circuits including first and second portion adapted for containing the binary data, including the substeps of (a-1) enabling acknowledgment of polling messages by the first portions of a first group of the EPL data circuits and disabling acknowledgment of the polling messages by the second portions of the first group of EPL data circuits to send a data value equal to zero to the EPL computer; and (a-2) disabling acknowledgment of polling messages by the first portions of a second group of the EPL data circuits and enabling acknowledgment of the polling messages by the second portions of the second group of EPL data circuits to send a data value equal to one to the EPL computer; and (b) transmitting the data to the EPL computer by the EPL data circuits in response to a polling message from the EPL computer.

11. The method as recited in claim 10, further comprising the step of:

(c) before step (b), transmitting a signal in response to a prior polling message from the EPL computer indicating that the portion of the data is ready for transmission.

12. The method as recited in claim 10, further comprising the steps of:

(c) receiving an acknowledgment signal from the EPL computer indicating that the EPL computer has received the portion of the data; and (d) displaying an indication to an operator that the portion of the data has been received by the EPL computer.

13. The method as recited in claim 12, further comprising the steps of:
   (e) receiving another acknowledgment signal from the EPL computer indicating that the EPL computer has acted upon the data; and
   (f) displaying an indication to an operator that the EPL computer has acted upon the data.

14. The method as recited in claim 10, further comprising the steps of:
   (c) before step (a), recording information entered by an operator by a keypad;
   (d) displaying the recorded information by a display; and
   (e) converting the recorded information into the data by a microcontroller.

15. A communication device for an electronic price label (EPL) system comprising:
   a microcontroller;
   a first EPL circuit enabled by the microcontroller, which sends a first signal to an EPL computer in response to a first polling signal from the EPL computer indicating that data from the microcontroller is ready for transmission;
   a number of second EPL circuits which store the data from the microcontroller and which send the data to the EPL computer in response to a second polling signal from the EPL computer;
   a third EPL circuit which receives a second signal from the EPL computer acknowledging receipt by the EPL computer of the data, and which signals the microcontroller of the receipt of the data;
   a keypad coupled to the microcontroller for recording the data from an operator;
   a display for displaying the data as it is recorded and for displaying an indication of the receipt of the data;
   wherein the first and second EPL circuits each comprise:
      a first portion including first control circuitry having a first unique address and a first state;
      a second portion including second control circuitry having a second unique address and a second state different from the first state; and
      an inverter coupled between the first and second control circuitries which causes the second state to be opposite to the first state.

16. The communication device as recited in claim 15, wherein the first and second EPL circuits each further comprise:
   first and second antennae coupled to the first and second control circuitries for receiving polling messages from the EPL computer and for sending data to the EPL computer in response to the polling messages;
   first and second memories coupled to the first and second control circuitries; and
   first and second batteries coupled to the first and second control circuitries.

* * * * *